Nov. 18, 1958    E. W. PAXTON    2,860,449
CONTINUOUS GLASS MELTING FURNACE
Filed July 7, 1955    2 Sheets-Sheet 1
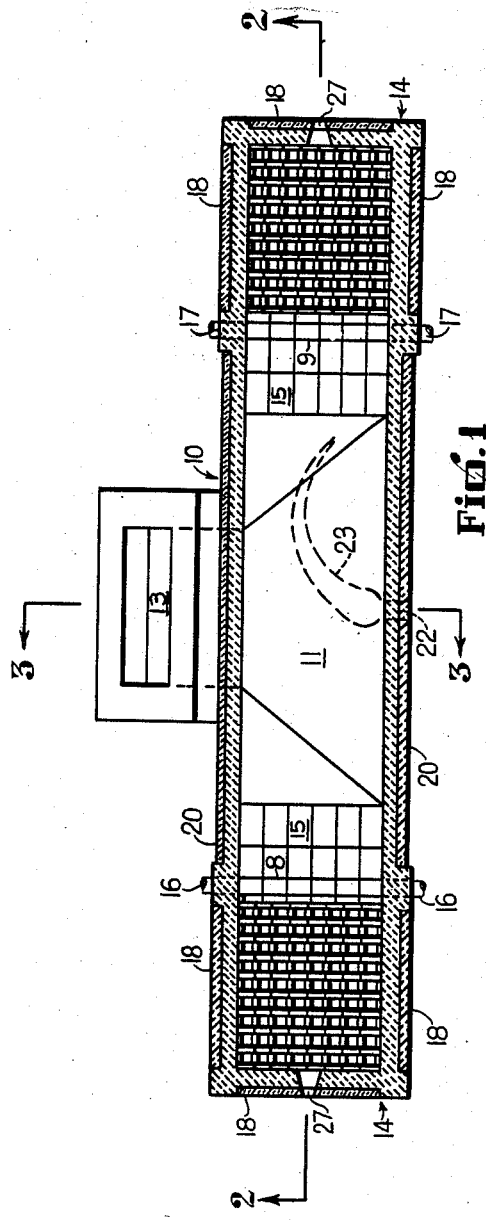
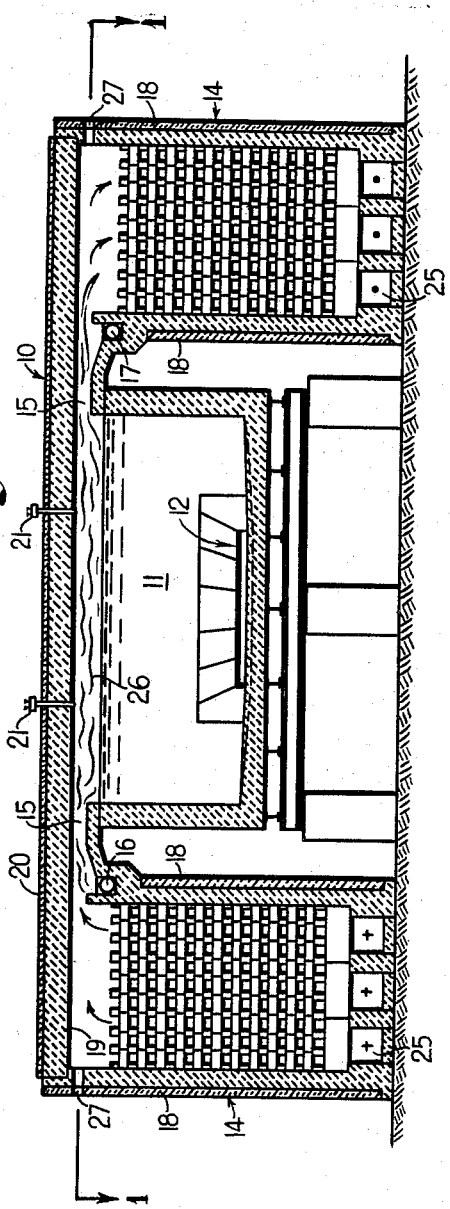
INVENTOR.
Elisha W. Paxton.
BY Palmer Fultz
HIS ATTORNEY Nov. 18, 1958     E. W. PAXTON     2,860,449
CONTINUOUS GLASS MELTING FURNACE Filed July 7, 1955     2 Sheets-Sheet 2

INVENTOR.
Elisha W. Paxton.
BY *Palmer Fultz*
HIS ATTORNEY

United States Patent Office 2,860,449
Patented Nov. 18, 1958

2,860,449

CONTINUOUS GLASS MELTING FURNACE

Elisha W. Paxton, Columbus, Ohio, assignor to Thermal Engineering Company, Columbus, Ohio, a partnership of Ohio Application July 7, 1955, Serial No. 520,477

9 Claims. (Cl. 49—54)

The present invention relates generally to improvements in the design and structure of glass melting furnaces of the regenerative type, adapted to the continuous production of molten glass, and particularly to the type of such furnaces embodying separated melting and working basins, connected by one or more submerged passages or throats, its principal object being to improve the over-all thermal efficiency of such furnaces, especially in the smaller sizes of same.

The invention by Siemens of the regenerative firing system which commonly bears his name afforded two major advances in the art of high-temperature melting, by increasing the maximum temperatures attainable and by improving the thermal efficiency of such operations, both of said advances being due to the alternate absorption of heat from the waste gases and the utilization of the same absorbing means to preheat the incoming combustion air.

Even so, the thermal efficiency of Siemens-type regenerative glass melting furnaces is, at best, of the order of 20 percent, even in the largest furnaces, which have heretofore also been the most efficient.

The smaller furnaces have heretofore attained thermal efficiencies of the order of only 10 percent, or even 5 percent, despite utmost efforts directed to improvement in their design.

I have discovered that by a unique combination of elements, the thermal efficiency of the smaller furnaces, for the production of approximately 10 to 25 tons or more of molten glass per day, may be made to equal or even to exceed that of the largest and most efficient furnaces.

It is a simple geometric fact that the smaller the combined volume of molten glass and the combustion space above it that is to be confined within refractory walls, the greater, proportionately to such volume, becomes the total wall area and the resultant heat loss through same, and similarly, that the shape of the volume enclosed will also greatly affect the total area of the enclosing walls and thus the heat losses relative to the volume enclosed.

It must therefore be a cardinal principle, in seeking to improve the thermal efficiency of furnace structures for high-temperature melting, that the enclosed volume be as compact as possible.

While a cubical shape would be the practical ideal from the standpoint of thermal losses alone, such a shape imposes virtually insuperable limitations, especially in relatively small furnaces, upon the use of the most desirable and efficient type of firing for the purpose.

It is well known that flames of relatively high luminosity and radiating power are most desirable because they transfer most of the total thermal energy of the fuel to the furnace, and to the work therein, at the speed of light.

Such flames, especially when of the single-layer type, of substantial thickness, must be developed relatively slowly, that is, at relatively low and approximately equal velocities of the gaseous fuel and combustion air, to permit of mutual diffusion of the same into one another at rates which will cause a substantial proportion of the hydrocarbons in the fuel to be converted into minute carbon particles by the well-known characterization of "cracking." The size of such carbon particles is so small that they float freely with the flame and form, as they burn, the luminous part of same, contributing by far the major part of the intensely radiant character of such flames.

Said cracking of hydrocarbons, and the subsequent combustion of the free carbon formed thereby, requires appreciable amounts of time and thus a relatively long flame life, and consequently a relatively long flame path, for the efficient utilization of such flames over the work. For example, for equal rates of fuel input, the length of luminous flames of high radiant emissivity may be, of necessity, 5 to 20 or more times that of relatively non-luminous, high-velocity flames, though the initial velocity of the latter may be many times that of the former. The total time for equal transfers of thermal energy from fuel to work by a relatively non-luminous flame is, however, many times that required by a relatively highly luminous flame of high radiant emissivity, from equal amounts of fuel. This explains the major reason why, though they may be generated and their actual combustion completed in much less length of travel than luminous flames of high radiant emissivity, they are much less efficient than the latter, for they have far less ability to transfer their energy quickly to their surroundings. In accordance with the foregoing, the maximum flame temperatures and waste gas temperatures of relatively luminous flames are, of necessity, much lower generally than those of relatively non-luminous flames.

One of the great weaknesses in the design of the smaller furnaces heretofore has been the inadequacy of their flame paths as to length, due to the physical limitations of their smaller structures, for the use of anything but flames of relatively short life in the furnace proper. This has compelled the use of quicker-mixed, less efficient, relatively non-luminous flames.

This has, in large measure, been due to the persistence, in previous regenerative glass melting furnace design, of providing for predominantly horizontal travel of the molten glass and then, necessarily, firing parallel to the shorter dimension of the surface of the glass bath in so-called side-port furnaces.

In the case of end-port regenerative furnaces, though their flame paths may be longer, such furnaces suffer from a chronic deficiency in maximum possible flame coverage of the bath, which, in this type, can never be more than 50 percent and usually is considerably less.

It will therefore be understood that the theoretically desirable cubical dimensions of the total enclosed volume of the glass bath and combustion space must be subject to compromise, if the most efficient type of firing is to be employed in the smaller furnaces. Moreover, if one of the horizontal planar dimensions of the melting surface area of a small furnace is to be increased to afford an adequate length of flame path, at the same time avoiding having the location of all inlet and outlet ports (alternately designated, as in regenerative firing) in the same end wall of the furnace, to avoid the weakness of the end-port regenerative furnace design as to inadequate flame coverage of the bath, the whole design of the furnace must be radically changed.

For example, if opposed firing ports are to be retained, not only must the normal length and width dimensions of the conventional side-port furnace be exchanged one for the other, but, combined with this, the horizontal surface travel of the glass must be eliminated, since it would in such case be obliged to travel the width rather than the length of the furnace melting surface, and such width distance becomes entirely inadequate for horizontal surface travel of the glass as judged by prior standards, and in actual fact, if prior practices are to be relied upon.

The accomplishment of this step, as explained hereinafter, makes possible, in view of the dimensions involved for the capacity range previously stated, the design of firing ports which, in addition to being eminently suited to the development of luminous flames of high radiant emissivity, present no interrupting structure to the development of a sheet of flame whose origin is continuous along one and alternately along the other of the shorter of the horizontal planar dimensions of the combustion space above the glass bath.

Thus may be accomplished, at one and the same time, the elimination of one of the major weaknesses, efficiency-wise, of both of the predominant types of regenerative furnaces, the side-port type and the end-port type, because neither, according to their basic design, can provide the full flame coverage over the bath that is provided by the subject furnace.

Even in the most efficient practice in the past, wherein the flames are so directed and located as to heat the glass surface to a greater degree than the roof, the glass actually loses heat by radiation to the roof between the flame paths in the side-port furnace, and along the entire idle half of that side of the end-port furnace which, at the moment, is not being fired, thus causing irremediable thermal losses of considerable importance.

The transfer of heat by radiation from flame to work being inversely proportional to the square of the distance between them, it is important to highest thermal efficiency that the flame be confined and held down as close as possible to the surface of the bath throughout its effective life, since the flame has a strong tendency to rise as combustion proceeds and since, for the development of flames of relatively high luminosity and radiating power, the requisite low velocities are otherwise insufficient to maintain the position of the flame with respect to the bath by the expenditure of their directional kinetic energy.

Moreover, unless flames of low enough temperature can be developed, any attempt to confine and direct them by means of refractory structures will result in premature failure of the structure. This is well known in the art and such possibilities are scrupulously avoided by designing highly-arched roofs which are as far removed from the most powerful zones of the flames as is practicable, and by designing for such flame velocities and directions as will project the flame forcibly away from the roof and close to the surface of the bath.

I have discovered that the type of luminous flame that is desirable for practicing the present invention is capable of controlled generation to develop maximum temperatures that are low enough to permit close confinement by the refractory walls and roof without damaging them and at the same time will have temperatures high enough to melt and refine glass at a satisfactory rate.

I have found that such flames, with natural gas as the fuel, may be generated from reservoirs for gaseous fuel located beneath the preheated air stream in the furnace structure in a manner later to be illustrated. Accordingly, such flames may be confined safely and closely by refractories so arranged as to produce an initial velocity of the order of 20 feet per second without developing any temperatures in excess of 3200 degrees F. as determined by optical pyrometer, and will average considerably below that figure.

I have further found that with such controlled-flame confinement the safety factor is great enough that a 12-inch-thick flat suspended silica roof of proper design may be used, and, moreover, that considerable thickness of thermal insulation may safely be applied to same, thus further increasing the over-all thermal efficiency of the furnace.

By such means, fuel consumption is minimized because the combustion space may then be limited in height to afford a desired flame thickness of about 15 inches, and such limited height of combustion space need only be supplied with sufficient fuel and air to generate enough flame to fill it at relatively low velocities.

A further advantage is gained by being able thus to confine and guide the flame in that the direction and position of the flame not only are maintained throughout its effective life of approximately one second, but as its combustion nears completion and as its character changes from a solid blanket to darting tongues, as is the nature of such flames, flame velocity has gradually increased, instead of diminishing, as is the case with attempts to direct a free flame solely by means of higher initial velocities, to approximately 150 percent of the initial flame velocity. This is due to the progressive temperature increase engendered by combustion, coupled with the vertical and bilateral confinement of the flame. Thus, the rate of heat transfer to the bath is well maintained throughout the length and effective life of the flame, including the surface area of the bath under said darting tongues, because more flame, though less-continuous in character across its width, must thus traverse this particular area of the bath in unit time.

Dimensional provision for extensive longitudinal horizontal travel of the glass at the surface of the melting basin has been so customary heretofore as to be universally judged to be necessary to the proper melting and refining of the glass.

That is, the opinion has been held that there must be a so-called "refining area" occupying a part of the surface area of the melting basin and segregated from and inviolate of that part of said surface area occupied by the floating unmelted raw materials.

As stated hereinbefore, such provision of a "refining area" portion of the melting surface is incompatible with maintenance of my present least-extended melting basin, in view of the desired firing requirements and limitations.

By application, however, of certain of the principles taught in my United States Letters Patent "Continuous Glass Melting Tank," Number 2,061,945, issued October 8, 1935, I have found that substantially all longitudinal horizontal movement of the glass may advantageously be eliminated and may be substituted by the vertical movement of orderly displacement, except, of course, random distribution movements at the surface; and an ultimate horizontal movement of the glass arriving at the bottom of the melting basin as it progresses toward and through the throat.

I have discovered that when the influence of the hydraulic flow conditions set up at a throat or throats is divorced from any possibility of disrupting the orderly movement or flow of any or all strata of molten glass above throat lintel level, by proportioning throat area to glass viscosity at its temperature at throat level as taught in the above-mentioned patent, not only may unidirectionally-sustained horizontal glass flow in the upper strata be substantially eliminated and true vertical displacement be substituted therefor, but also that satisfactory refining by the rise and bursting of bubbles and seed may be accomplished in and at the glass surface areas between and among floating piles of raw materials. Moreover, due to the lack of unidirectionally-sustained horizontal surface and sub-surface flow currents, afforded by effective development and utilization of true vertical displacement, and to the action of the reversal of the regenerative firing system, the piles of raw materials will not be pushed or packed together into a solid blanket in a fixed location adjacent the charging source, but will wander freely about the surface of the melting basin with many open areas between and among them. This not only provides random open or free areas throughout the surface of the melting basin where bubbles and seed may rise and burst, but also insures increased exposure of the raw materials to the flame, to provide quicker melting than if the raw materials were massed into a solid blanket in the manner of conventional furnaces.

With the vertical displacement system of the present furnace, the only concern of the operator is the rate of rise of the bubbles and seed, relative to the rate of vertical displacement incident to the withdrawal of glass for working, and this rate of rise has proved so greatly to exceed the rate of vertical displacement, at the rated output capacity of the furnace, that seed-free refined glass is continuously available for working.

The depth of the melting basin and therefore the level of the throat I evaluate generally in accordance with the principles taught in my above-mentioned patent, that is, the depth will depend upon the temperature of the glass desired for working, in view of the temperature maintained at the melting surface, and upon the temperature gradient with depth of the particular glass to be melted.

I have discovered, however, that when operating according to the principle of vertical displacement in relatively small furnaces and in absence of unidirectionally-sustained horizontal surface and subsurface flow currents, the generally accepted approximation of 100 degrees F. temperature loss per vertical foot for flint or crystal glass in conventional furnace melting basins no longer holds true.

Thus, for a furnace of the subject type, with clay blocks forming the melting basin and a mean temperature of 2850 degrees F. at the underside of the silica roof, the mean temperature at the glass surface will be approximately 2700 degrees F. and the temperature gradient in the melting basin will be approximately 120 degrees to 130 degrees F. per vertical foot.

I have further been able to evaluate the preferred shape and minimum area of the throat aperture required for the prevention of "abnormal" throat performance under all conditions, where the adjective "abnormal" designates flow of glass of undesired temperature and viscosity downwardly into the throat passage from above throat lintel level, and where the throat bottom is not depressed relative to the bottom of the melting chamber, but is level with it, at their line of juncture.

First, with regard to throat design, throat aperture height should be at a practical minimum, say not over 6 inches, in view of the temperature-controlled viscosity gradient and its effect upon the resultant velocity differential from top to bottom of said throat aperture. Such minimum differential is desirable to minimize relative stagnation of glass strata at throat level, and to increase the precision of the calculations.

Next, if total throat aperture cross-sectional area be such that the maximum value of the flow at its top stratum will not exceed 2500 poise-inches per minute, said abnormal flow at the throat will not occur.

Throat dimensions according to the above may be calculated in the following manner:
(1) Glass temperature at throat lintel level: A degrees F.
(2) Viscosity of glass at throat lintel level: B poises.
(3) Maximum withdrawal or production rate: C pounds per minute.
(4) Density of glass at level of mean throat height: D pounds per cubic inch.
(5) Mean throat flow rate: $C/D$, or E cubic inches per minute.
(6) Temperature gradient: F degrees F. per vertical inch.
(7) Glass temperature at bottom of throat aperture: $A-(F \times 6$ inches throat aperture height): G degrees F.
(8) Viscosity of glass at G degrees F.: H poises.
(9) Ratio of throat aperture viscosities and thus of top throat stratum to bottom throat stratum velocities: $H/B$, or I.
(10) Maximum allowable velocity of top stratum at throat aperture: $2500/B$, or J inches per minute.
(11) Mean permissible velocity at throat aperture: $((J/I)+J)/2$, or K inches per minute.
(12) Mean throat velocity required by item 5, in a throat 6 inches high and of unit width of 1 inch: $E/6$ square inches, or L inches per minute.
(13) Throat width required: $(L/K) \times 1$ inch, or M inches.

Thus by combining and integrating the various factors hereinbefore described and by proportioning and interrelating them in such a manner as to take maximum advantage of the particular and individual properties of each for contributing to the thermal efficiency of the whole, I provide a furnace structure that possesses advantages which are not only a great practical value but which are unique in the art.

It is therefore an object of the present invention to provide a major improvement in the thermal efficiency of relatively small continuous regenerative glass melting furnaces.

It is a further object of the present invention to provide such a glass melting furnace adapted for substantially complete flame coverage with a substantially uniform rate of heat transfer to the surface of the melting basin of such furnace.

It is another object of the present invention to provide, in such a furnace, a single flame of continuous width, said flame being alternately reversible as to direction, and to confine such flame so closely that it shall remain contiguous to the roof, sidewalls and work-surface throughout its effective life.

It is another object of the present invention to provide a novel furnace of the type described capable of the controlled generation of a flame having a temperature low enough to prevent damage to its confining structure but high enough to perform its desired function at a satisfactory rate.

It is another object of the present invention to provide, in such a furnace, a flame which increases its velocity relative to the work-surface as its combustion progresses throughout its effective life.

It is another object of the present invention to provide a melting furnace structure, including the bath of molten glass, which has a volume that is a minimum compatible with development and maximum utilization of a luminous flame of high radiant emissivity.

It is another object of the present invention to provide a regenerative furnace structure having directly opposed firing and exhaust ports wherein the usual length and width dimensions of the melting bath are advantageously reversed, by providing for the true vertical displacement of the molten glass in the melting basin, down to throat lintel level.

It is another object of the present invention to provide a glass melting furnace which increases the exposure of the floating raw materials to the flame, to accelerate the melting thereof, by providing surface conditions on the melting basin bath, due to the combination of the vertical displacement of the molten glass and to the reversible influence of the flame, which conditions keep the piles of said raw materials segregated during melting, and prevent them from congealing into a compact mass.

It is another object of the present invention to provide a glass melting furnace which eliminates any relatively-static separately-defined single area of the melting surface, where bubbles and seed may rise and burst, and to substitute therefor the rising and bursting of all bubbles and seed in open surface spaces between and among mobile piles of floating raw materials.

It is another object of the present invention to provide a melting furnace of the type described which eliminates the use of any working basin whose size would be functionally proportioned to permit the molten glass, during its passage therethrough, to cool to working temperature from a substantially higher temperature, and to substitute therefor a conduit structure from the throat to the working zone, so designed as to minimize the possibility of the stagnation of any part of the molten glass therein.

It is another object of the present invention to provide a melting furnace adapted continuously to supply molten glass at substantially working temperature at throat lintel level in the melting basin by proportioning the depth of said basin in accordance with the vertical temperature gradient of the molten glass.

It is still another object of the present invention to provide a glass melting furnace adapted to insure and maintain true and uniform vertical displacement of molten glass in the melting basin by preventing entry into the throat passage of molten glass from above the level and temperature normal to the throat aperture lintel level under operating conditions. This is accomplished by proportioning the height and width of the throat aperture so that the former will be at a practical minimum and the latter will afford a throat aperture area, proportioned to the viscosity and density of the molten glass at throat lintel level under operating conditions, such that the flow of glass into said aperture shall not exceed a defined value having dimensions of poise-inches per minute at the lintel level of the said throat aperture, as hereinbefore set forth in detail.

Further objects and advantages of the present invention will be apparent from the following description, reference being had to the accompanying drawings wherein a preferred form of embodiment of the invention is clearly shown.

In the drawings:

Figure 1 is a sectional plan view of a furnace structure according to the present invention and designed to furnish glass for working by means of a machine, not shown, to produce flatdrawn sheet glass. The section is taken along the plane indicated at 1—1 in Figure 2;

Figure 2 is a sectional elevation along the longitudinal center line of the same furnace, its plane and direction of view being indicated at 2—2 in Figure 1.

Figure 3:
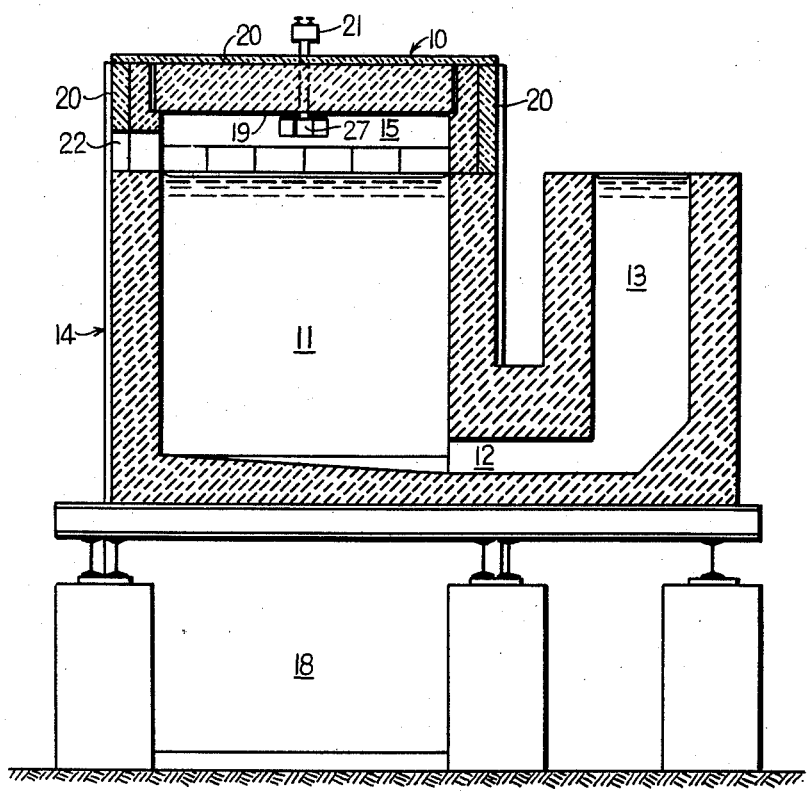
Figure 3 is a sectional elevation along the transverse center line of the same furnace, its plane and direction of view being indicated at 3—3 in Figure 1.

With reference to the figures, the furnace is indicated generally at 10 and is comprised of a melting basin 11, a throat passage 12, and a passage or conduit 13 for molten glass for working, all being constructed of refractory materials.

It should be stated that ancillary equipment common in the art, such as the forming machine, fuel piping, the regenerator flue system, air-reversing valve, stack, raw materials charging machine, and steel furnace stays are not illustrated in the drawings.

Regenerators 14, each containing the usual stacking of brick checkerwork, with flues beneath, and open spaces above which latter connect with firing ports 15, form the conventional Siemens regenerative firing system, when supplied with gaseous fuel alternately through pipes 16 and 17, serving to fill gas troughs 8 and 9; and when the flues 25 at their bottoms are arranged to be connectible alternately with a stack and with the atmosphere through the medium of a Siemens-type air-reversing valve.

In the proper development of the desired type of flame in the subject furnace, it should be borne in mind that since the dimensions of the flame source are so great, compared with those of integral burner structures which are commonly made of metal, and inasmuch as all the elements entering into the actual formation of the flame are exposed to relatively high temperatures, the said elements must be formed to the desired dimensions entirely by the use of refractory materials, and must form a part of the furnace structure itself.

As a specific example, the flame 26 shown in Figure 2 was developed as follows.

The preheated air, being actually lighter than the natural gas, tends to remain above it, so that the gas trough 8 may literally have the gas poured into it until it overflows upwardly into the air stream, which then entrains the gas as a substratum so that gradual interdiffusion may take place between them. Only partial or incomplete combustion takes place in any given zone in the flame length, and the process of complete combustion is therefore slowed down and delayed.

Some combustion, however, starts immediately when the gas meets the air and continues thereafter. Sufficient temperature increase is, however, continuously created by progressive combustion to continue to crack some of the as yet unburned hydrocarbons of the fuel into solid carbon particles of millimicron dimensions.

It will be understood that to accomplish the non-turbulent, smooth and level filling and overflow of the gas trough 8, the velocity of the incoming gas must be at a practical minimum.

For this reason, the trough is designed to be filled from both ends simultaneously and by piping, in this case, of a nominal diameter of 8 inches, which would normally be considered a greatly excessive diameter for the calculated maximum rate of fuel flow.

The cross section of the gas trough, in this case, was 9 inches wide and 9 inches deep, such that the upward velocity or vertical displacement of the gas was of the order of 0.4 foot per second, maximum, over its length of 6 feet, at the calculated maximum rate of fuel usage.

When the then horizontally-stratified gas and air layers reached the port exit to the firing chamber, at their calculated temperatures of 200 degrees and of 1,800 degrees F. respectively, and assuming them to have attained relatively equal velocities, their calculated horizontal velocity was a maximum of 20 feet per second.

At the entrance to the exhaust port, in view of the increased temperature due to combustion, velocity had increased to a calculated 31.4 feet per second.

The combustion air, having many times the volume and weight of the gas, therefore is the logical vehicle to use in developing the desired type of flame, which is exemplified in this case.

Conversely, any attempt to use the gas as a vehicle or as a directional force, by jetting it at relatively high velocity, invariably results in rapid mixing, due to turbulence, and more or less completely defeats the purpose as to development of a luminous flame of high radiant emissivity.

Likewise, luminous flames of high radiant emissivity must be pulled, in a sense, rather than be obliged to push their way into a relatively-quiescent atmosphere. Thus the subject furnace preferably employs inordinately low pressures at its exhaust port and consequently in the combustion space. These pressures are preferably very slightly negative and very slightly positive, respectively, in contrast to ordinary glass melting furnace practice, wherein they are both maintained positive, and are normally of the order of 0.015 and 0.030 inch of water column, respectively.

The regenerators, in this case, were of smaller volume than those commonly used, and the height of their checkerwork was especially low. They contained, at the abnormally close checker-brick spacing of 3¼ inches clear space in both horizontal directions, only 213 pounds of checker-brick per regenerator per square foot of melting-basin area. Stack losses were not, however, abnormal, at temperatures of 1,000 degrees F., maximum.

The foregoing was made possible by the facts that the flame was so efficient in radiating power that its waste gas temperature were near minimum; also that it is desirable that combustion air preheat temperatures are preferably to be limited, if turbulence is to be minimized in generatnig the flame; and by the fact that both desirable properties were achieved by the interaction of flame characteristics and regenerator design, without penalty.

Compactness of the regenerators was also contributed to because the relatively rapid glazing or vitrification of the piles of raw materials, coupled with their relatively-small area, and the relatively-low flame velocity over them, resulted in a very low rate of carry-over of solid materials therefrom into the regenerators, thus permitting use of much closer checker-brick spacing than the usual 6½ inches of clear space in both horizontal directions, without clogging. This lack of clogging was, in turn, aided by the relatively-low temperatures prevailing in the regenerators. The reduced amount of carry-over was therefore not fused into clogging masses but remained in granular state, thus being able to drop freely through the checkerwork.

The regenerator walls are preferably thermally insulated as indicated at 18.

The roof 19 is shown as of the flat-arch suspended type, adapted for the use of thermal insulation 20, with such insulation also being applied to the walls of the firing chamber.

Thermocouples 21 are used to indicate temperatures at the bottom surface of the roof.

A port 22 is provided for the continuous charging of raw materials by means of a water-cooled screw conveyor.

When firing in the direction illustrated, left to right, a train of granular unmelted raw materials will occupy, upon the surface of the molten glass, approximately the area indicated by the dashed lines at 23.

Soon after the firing is reversed, ambient surface thermal currents, together with the velocity of the moving flame 26, will cause said train to break and to swing toward the opposite port 15 which is then functioning as an exhaust port.

The melting rate is so rapid that the raw materials rarely, if ever, reach the walls and there is no relatively-fixed so-called "foam line." Thus the foam from the melting raw materials cannot continuously exert its particularly corrosive properties upon the basin walls, as in conventional furnaces, since it, too, rarely, if ever, reaches them.

There are no unidirectional horizontal movements of hot glass at the surface, and the movements that do occur are extremely transient and wandering in character, being so superficial that they readily change their direction with reversals of the firing.

In view of the foregoing description, it will be readily apparent to those familiar wth the art that the furnace of the present invention differs radically from prior furnaces, not only as to its structural configuration but also as to novel functions and advantages resulting therefrom.

It should be mentioned that a furnace of the subject type has been built and operated experimentally for sufficient time to obtain the essential and specific data presented herein and fully to corroborate, by its performance, the calculations upon which its novel construction was based.

Although the inventive concept is articulated by relatively simple structure, its beneficial advantages can only be fully realized by the specific and unobvious combinations of elements herein described and illustrated.

Moreover, in addition to the fuel saving afforded, which, alone, would amply justify its employment, the present invention affords many other less-obvious advantages which, not having to do specifically with the inventive concept, have not thus far been dealt with.

Some typical examples may, however, be cited, such as the reduction in factory floor space afforded by the compact design; complete accessibility of all furnace elements; its ability to be drained and refilled with other glass in less than 5 days, due to its small volume; ability readily to change the working temperature of the glass by applying or removing thermal insulation or radiation shields about the bottom and the lower part of the sides of the melting basin, without penalty as to life of the basin refractories, because of the relatively low temperature of the glass behind them in those areas.

While the form of embodiment of the present invention as herein disclosed constitutes a preferred form, it is to be understood that other forms might be adopted, all coming within the scope of the claims which follow:

I claim:

1. A furnace for the continuous production of molten silicates comprising, in combination, a rectangular melting and refining basin for containing a bath of said silicates and including a first firing port across substantially the entire length of a first side of said basin and a second firing port across substantially the entire length of a second side of said basin opposite said first side; firing means for producing a flame blanket alternatively originating at said ports and extending over substantially the entire surface of said bath; and a submerged throat through a third side of said basin, said throat including an inlet underlying the paths of said flame blankets.

2. The furnace structure defined in claim 1 wherein said third side is greater in length than said first and second sides.

3. The furnace structure defined in claim 1 provided with a roof including a plane continuous under surface disposed horizontally over substantially the entire surface of said bath.

4. The furnace structure defined in claim 1 wherein each of said firing ports includes means for discharging a flow of combustion air over a supply of gaseous fuel.

5. The method of continuously melting and refining molten silicates which method comprises covering the entire surface of a bath of molten silicates with a first flame and then with a second flame, said flames being produced in alternative succession and oppositely directed along a common flame path; displacing said molten silicates downwardly in said bath by uniform vertical displacement; and withdrawing said downwardly displaced molten silicates in a horizontally extending direction transverse to said flame path.

6. The method of claim 5 wherein the length of said flame, along said flame path, is greater than the width of said flame.

7. The method defined in claim 5 including the step of closely confining said flame to the surface of said bath.

8. The method defined in claim 5 wherein a flow of combustion air is discharged over a supply of gaseous fuel to produce a luminous flame.

9. The method of continuously melting and refining molten silicates which method comprises heating the surface of a bath of molten silicates by means of a single closely confined flame that covers a single integrated melting and refining area on said surface, said flame being produced in alternative succession at oppositely disposed origins; displacing said molten silicates downwardly from said integrated melting and refining area; and withdrawing said molten silicates in a direction transverse to both said flame path and to said direction of downward displacement.

References Cited in the file of this patent

UNITED STATES PATENTS

| | | |
|---|---|---|
| 1,828,833 | Drake | Oct. 27, 1931 |
| 2,179,848 | Forter | Nov. 14, 1939 |
| 2,249,714 | McBurney | July 15, 1941 |
| 2,300,426 | Longenecker | Nov. 3, 1942 |
| 2,328,917 | Longenecker | Sept. 7, 1943 |